US012711739B2

(12) United States Patent
Martinez et al.

(10) Patent No.: US 12,711,739 B2
(45) Date of Patent: Aug. 18, 2026

(54) CONTEXT-BASED EVALUATION OF IMAGE REPOSITORIES WITH FILTERING

(71) Applicant: Microsoft Technology Licensing, LLC, Redmond, WA (US)

(72) Inventors: Andy Daniel Martinez, Pembroke Pines, FL (US); Paul Pangilinan Del Villar, Bothell, WA (US); Pramod Sharma, Seattle, WA (US); Yijian Xiang, Redmond, WA (US); Zhihui Guo, Kirkland, WA (US); Nilgoon Zarei, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 265 days.

(21) Appl. No.: 18/583,610

(22) Filed: Feb. 21, 2024

(65) Prior Publication Data

US 2025/0265813 A1 Aug. 21, 2025

(51) Int. Cl.
*G06K 9/00* (2022.01)
*G06F 16/538* (2019.01)
*G06V 10/764* (2022.01)

(52) U.S. Cl.
CPC .......... *G06V 10/764* (2022.01); *G06F 16/538* (2019.01)

(58) Field of Classification Search
CPC .... G06F 16/353; G06F 16/285; G06F 18/241; G06F 16/538; G06V 10/764; G06V 30/19173; G06V 40/172; G06V 10/255; G06V 40/1365; G06N 3/045
See application file for complete search history.

(56) References Cited

U.S. PATENT DOCUMENTS

| | | | | |
|---|---|---|---|---|
| 12,032,614 | B2 * | 7/2024 | Yang | G06N 20/00 |
| 2018/0157681 | A1 * | 6/2018 | Yang | G06F 16/538 |
| 2020/0193206 | A1 * | 6/2020 | Turkelson | H04N 25/00 |

OTHER PUBLICATIONS

He, et al., "Deep Residual Learning for Image Recognition", in Proceedings of the IEEE Conference on Computer Vision and Pattern Recognition, Dec. 10, 2015, 12Pages.
Howard, et al., "Mobilenets: Efficient convolutional neural networks for mobile vision applications",in arXiv e-prints, arXiv:1704.04861v1, Apr. 17, 2017, 9 pages.
Ren et al., "Faster R-CNN: Towards Real-Time Object Detection with Region Proposal Networks", Computer Vision and Pattern Recognition (cs.CV), Jan. 6, 2016, 14 pages.

* cited by examiner

*Primary Examiner* — Gregory A Morse
*Assistant Examiner* — Kevin M Coomber
(74) *Attorney, Agent, or Firm* — Rainier Patents, P.S.

(57) ABSTRACT

This document relates to context-based evaluations of objects in an image repository. For example, the disclosed implementations can employ image classification and/or object detection models to filter images in an image repository to obtain a filtered subset of images. Then, a context-weighted metric can be determined for a designated object subclassification of objects in the subset. For instance, the context-weighted metric can represent the significance of the designated subclassification relative to one or more other object subclassifications from a larger object classification. The context-weighted metric can be employed for operations such as responding to queries over the image repository.

20 Claims, 12 Drawing Sheets

SYSTEM 900

SERVER 940

PROCESSING RESOURCES 901(4)
STORAGE RESOURCES 902(4)
TUNING MODULE 941
CLASSIFICATION MODEL(S) 942
DETECTION MODEL(S) 943
METRIC DETERMINATION MODULE 944

SERVER 930

PROCESSING RESOURCES 901(3)
STORAGE RESOURCES 902(3)
MODEL PRETRAINING MODULE 931

NETWORK(S) 950

CLIENT DEVICE 910

PROCESSING RESOURCES 901(1)
STORAGE RESOURCES 902(1)
LOCAL IMAGE REPOSITORY 911
LOCAL APPLICATION 912

SERVER 920

PROCESSING RESOURCES 901(2)
STORAGE RESOURCES 902(2)
REMOTE IMAGE REPOSITORY 921
REMOTE APPLICATION 922

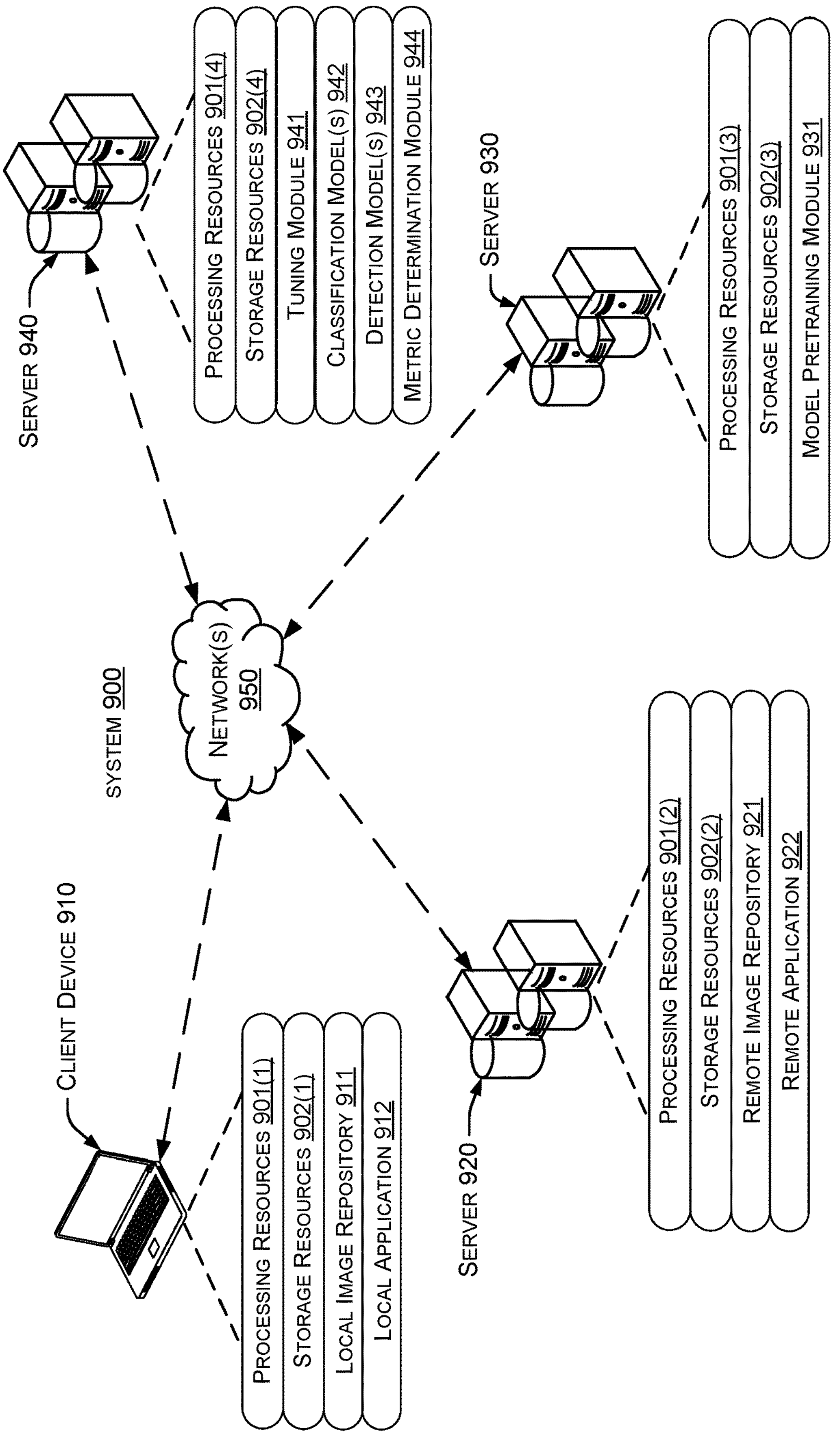

FIG. 9

CONTEXT-BASED EVALUATION OF IMAGE REPOSITORIES WITH FILTERING

BACKGROUND

One important use case for computing devices involves analyzing images, such as images from a user's personal image repository or images accessible via an image repository provided by a search engine or social media service. Various computer vision techniques target the accurate detection and classification of objects in images. However, these techniques do not consider the context in which the objects appear, and thus convey limited information about a given set of images.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for analyzing images. One example includes a method or technique that can be performed on a computing device. The method or technique can include receiving input identifying a designated object subclassification, the designated object subclassification being part of designated object classification having multiple object subclassifications including the designated object subclassification and one or more other object subclassifications. The method or technique can also include filtering images of an image repository to obtain a filtered subset of images that meet one or more filtering criteria relating to the designated object classification. The method or technique can also include determining different contexts represented in the filtered subset of images, wherein the different contexts are associated with different context-specific weights. The method or technique can also include detecting objects of the designated object classification in the filtered subset of images. The method or technique can also include classifying the detected objects into the multiple object subclassifications, the classified objects including particular objects classified into the designated object subclassification and one or more other objects classified into the one or more other object subclassifications. The method or technique can also include applying the different context-specific weights to occurrences of the particular objects that are classified into the designated object subclassification to determine a context-weighted metric. The method or technique can also include performing at least one operation based at least on the context-weighted metric.

Another example entail a system that includes a processor and a storage medium storing instructions. When executed by the processor, the instructions can cause the system to filter images of an image repository to obtain a filtered subset of images that meet one or more filtering criteria relating to a designated object classification that includes multiple object subclassifications including a designated object subclassification and one or more other object subclassifications. The instructions can also cause the system to determine different contexts represented in the filtered subset of images, wherein the different contexts are associated with different context-specific weights. The instructions can also cause the system to detect objects of the designated object classification in the filtered subset of images. The instructions can also cause the system to classify the detected objects into the multiple object subclassifications, the classified objects including particular objects classified into the designated object subclassification and one or more other objects classified into the one or more other object subclassifications. The instructions can also cause the system to apply the different context-specific weights to occurrences of the particular objects that are classified into the designated object subclassification to determine a context-weighted metric. The instructions can also cause the system to perform at least one operation based at least on the context-weighted metric.

Another example includes a computer-readable storage medium storing executable instructions which, when executed by a processor, cause the processor to perform acts. The acts can include receiving input identifying a designated object subclassification, the designated object subclassification being part of designated object classification having multiple object subclassifications including the designated object subclassification and one or more other object subclassifications. The acts can also include filtering images of an image repository to obtain a filtered subset of images that meet one or more filtering criteria relating to the designated object classification. The acts can also include determining different contexts represented in the filtered subset of images, wherein the different contexts are associated with different context-specific weights. The acts can also include detecting objects of the designated object classification in the filtered subset of images. The acts can also include classifying the detected objects into the multiple object subclassifications, the classified objects including particular objects classified into the designated object subclassification and one or more other objects classified into the one or more other object subclassifications. The acts can also include applying the different context-specific weights to occurrences of the particular objects that are classified into the designated object subclassification to determine a context-weighted metric. The acts can also include performing at least one operation based at least on the context-weighted metric.

The above-listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIG. 9 illustrates an example of a system in which the disclosed implementations can be performed, consistent with some implementations of the present concepts.

DETAILED DESCRIPTION

Overview

Figure 1:
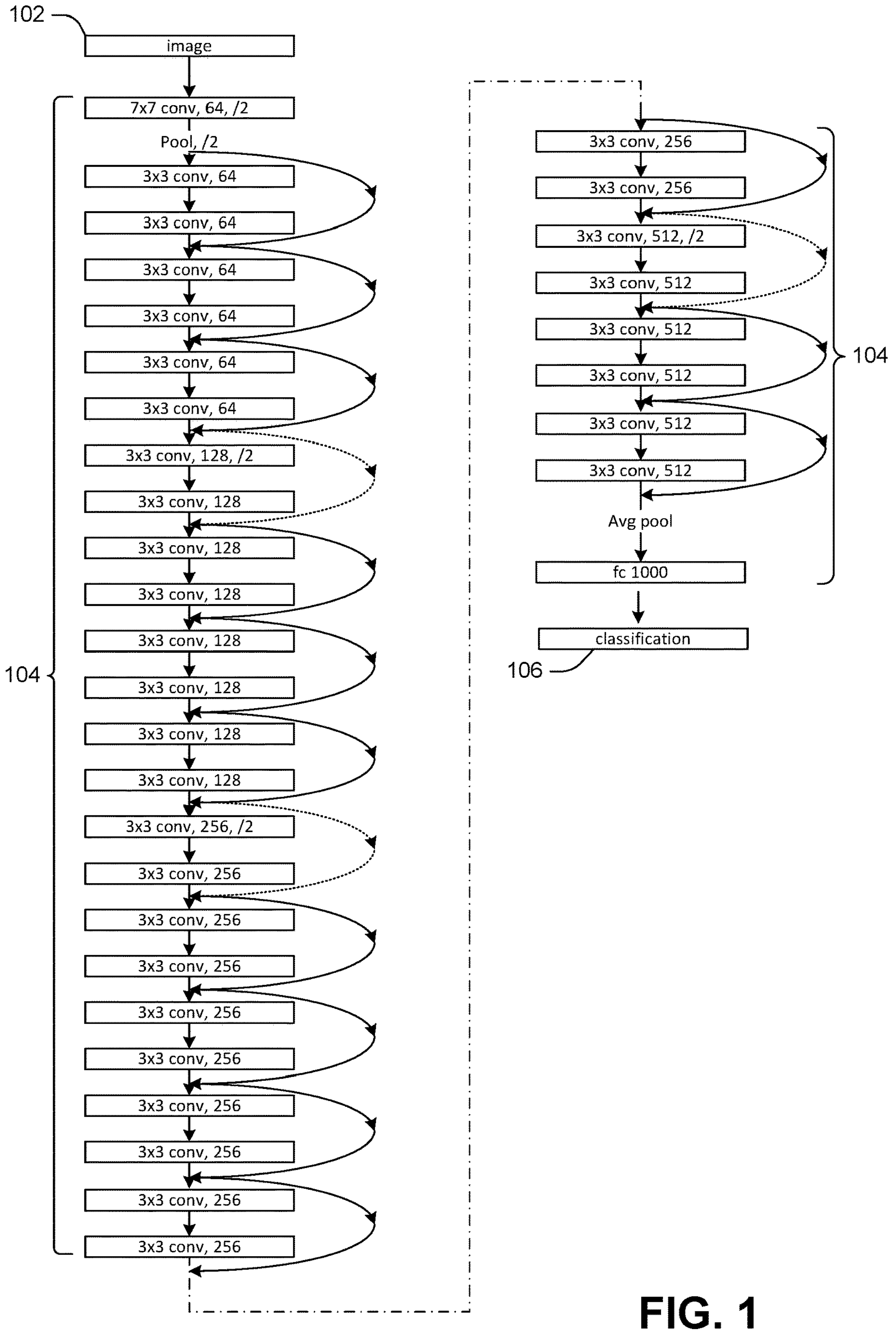
FIG. 1 illustrates an example machine learning model that can be employed for image classification, consistent with some implementations of the present concepts.

As noted above, modern computer vision models can accurately detect objects in images and can also accurately classify detected objects into object classifications, e.g., horses, houses, bicycles, etc. However, in some cases, objects can tend to appear in certain contexts more often than others. For instance, surfboards might appear more frequently in images of beaches than in images with cars, whereas skateboards might appear more often in images of cars than in images of beaches. Generally speaking, it can be very useful to understand how often different objects tend to appear more or less frequently in different contexts.

However, there is no efficient way to quantify the extent to which different objects appear in different contexts in an image repository. One way to evaluate an image repository is to detect all of the objects in the images, classify the detected objects into respective classifications, and then classify the respective contexts of each image. Then, subsequent analysis could be performed to infer the relative significance of different object classifications in different contexts. However, this approach involves applying separate classification and detection models to every image in the repository. Because image classification and detection models can be resource-intensive with respect to processing, memory, and/or storage utilization, this approach is quite inefficient and wasteful of computing resources.

The disclosed implementations can employ a filtering approach to evaluate the context in which different object classifications appear in images. More specifically, the disclosed techniques can filter an image repository using one or more filtering criteria to remove images from consideration that lack objects relating to a designated object classification of interest. The remaining images can be processed using one or more computer vision models to obtain metrics reflecting the relative significance of one object subclassification relative to other object subclassifications that are also represented in the repository. Thus, the disclosed implementations can efficiently perform context-based evaluation of an image repository in a manner that is computationally efficient.

Machine Learning Overview

There are various types of machine learning frameworks that can be trained to perform a given task. Support vector machines, decision trees, and neural networks are just a few examples of machine learning frameworks that have been used in a wide variety of applications, such as image processing and natural language processing. Some machine learning frameworks, such as neural networks, use layers of nodes that perform specific operations.

In a neural network, nodes are connected to one another via one or more edges. A neural network can include an input layer, an output layer, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs. Various training procedures can be applied to learn the edge weights and/or bias values. The term "parameters" when used without a modifier is used herein to refer to learnable values such as edge weights and bias values that can be learned by training a machine learning model, such as a neural network.

A neural network structure can have different layers that perform different specific functions. For example, one or more layers of nodes can collectively perform a specific operation, such as pooling, encoding, or convolution operations. For the purposes of this document, the term "layer" refers to a group of nodes that share inputs and outputs, e.g., to or from external sources or other layers in the network. The term "operation" refers to a function that can be performed by one or more layers of nodes. The term "model structure" refers to an overall architecture of a layered model, including the number of layers, the connectivity of the layers, and the type of operations performed by individual layers. The term "neural network structure" refers to the model structure of a neural network. The term "trained model" and/or "tuned model" refers to a model structure together with parameters for the model structure that have been trained or tuned. Note that two trained models can share the same model structure and yet have different values for the parameters, e.g., if the two models are trained on different training data or if there are underlying stochastic processes in the training process.

There are many machine learning tasks for which there is a relative lack of training data. One broad approach to training a model with limited task-specific training data involves "transfer learning." In transfer learning, a model is first pretrained on another task for which significant training data is available, and then the model is tuned to the particular task using the task-specific training data.

The term "pretraining," as used herein, refers to model training on a set of pretraining data to adjust model parameters in a manner that allows for subsequent tuning of those model parameters to adapt the model for one or more specific tasks. In some cases, the pretraining can involve a self-supervised learning process on unlabeled pretraining data, where a "self-supervised" learning process involves learning from the structure of pretraining examples, potentially in the absence of explicit (e.g., manually-provided) labels. Subsequent modification of model parameters obtained by pretraining is referred to herein as "tuning." Tuning can be performed for one or more tasks using supervised learning from explicitly-labeled training data, in some cases using a different task for tuning than for pretraining.

Terminology

The term "machine learning model" refers to any of a broad range of models that can learn from training data. For instance, a machine learning model could be a neural network, a support vector machine, a decision tree, a clustering algorithm, etc. In some cases, a machine learning model can be trained using labeled training data, a reward function, or other mechanisms, and in other cases, a machine learning model can learn by analyzing data without explicit labels.

The term "image classification model" refers to any of a broad range of machine learning models that can be employed to classify images. For instance, AlexNet, VGG-Net, Resnet, Inception, and/or CLIP models can be employed for image classification. The term "object detection model" refers to any of a broad range of machine learning models that can be used to detect objects in images, e.g., by outputting one or more bounding boxes around one or more objects in an image.

For instance, models such as R-CNN, Fast R-CNN, Faster R-CNN, and/or YOLO can be employed for object detection. Object detection can also involve classifying the detected objects into one or more object classifications. Image classification and object detection models are examples of computer vision models. Computer vision models are a type of image processing model. Other types of image processing models can perform image enhancement/modification (e.g., sharpening, blurring, contrast enhancement, etc.).

The term "classification" generally refers to a category or type of object or environment that is represented in an image. For instance, a surfboard and a skateboard are two different object classifications. In some cases, object classifications can be hierarchical, e.g., a soft drink and a juice are two example object subclassifications of a beverage object classification. The term "context" refers to any other characteristic of an image that a given object appears in. For instance, one type of context is the environment that an object appears in. Thus, for instance, an image of a surfboard at a beach can be considered as the surfboard being presented in a beach environment context. Another type of context relates to classifications of other objects that appear in an image with a given object. For example, an image of a dog being walked by a female person can be considered as the dog being presented in context with a female human.

Example Image Classification Model

FIG. 1 illustrates an example of an image 102 being classified by an image classification model 104 to determine an image classification 106. For instance, image classification model 104 can be a ResNet model (He, et al., "*Deep Residual Learning for Image Recognition*," in Proceedings of the IEEE Conference on Computer Vision and Pattern Recognition, 2016, pp. 770-778). The image classification model can include a number of convolutional layers, most of which have 3×3 filters. Generally, given the same output feature map size, the convolutional layers have the same number of filters. If the feature map size is halved by a given convolutional layer (as shown by "/2" in FIG. 1), then the number of filters can be doubled to preserve the time complexity across layers.

After the image has been processed using a series of convolutional layers, the image is processed in a global average pooling layer. The output of the pooling layer is processed with a 1000-way fully-connected layer with softmax. The fully-connected layer can be used to determine a classification, e.g., an object category of an object in image 102.

The respective layers within image classification model 104 can have shortcut connections which perform identity operations:

$$y = F(x, \{W_i\}) + x \tag{1}$$

where x and y are the input and output vectors of the layers involved and $F(x,\{W_i\})$ represents the residual mapping to be learned. In some connections the dimensions increase across layers (shown as dotted lines in FIG. 1). In these cases, the following projection can be employed to match the dimensions via 1×1 convolutions:

$$y = F(x, \{W_i\}) + W_s x \tag{2}$$

In some implementations, image classification model 104 can be pretrained on a large dataset of images, such as ImageNet. Such a general-purpose image database can provide a vast number of training examples that allow the model to learn weights that allow generalization across a range of object categories. Said another way, image classification model 104 can be pretrained in this fashion.

After pretraining, image classification model 104 can be tuned on another, smaller dataset for categories of interest. For instance, if a user is interested in the object classifications of surfboards and skateboards, then a smaller training dataset of images with surfboards and skateboards can be employed to tune the image classification model. In some implementations, one or more layers of the pretrained image classification model (e.g., the fully-connected layer) can be removed and replaced with another fully-connected layer that is initialized and tuned together with the existing pretrained layers. In other words, the parameters of the pretrained layers that are learned during pretraining can be adjusted during tuning, while the parameters of the newly-added fully-connected layer can be learned from scratch (e.g., a random initialization) during tuning.

Example Object Detection Model

Figure 2:
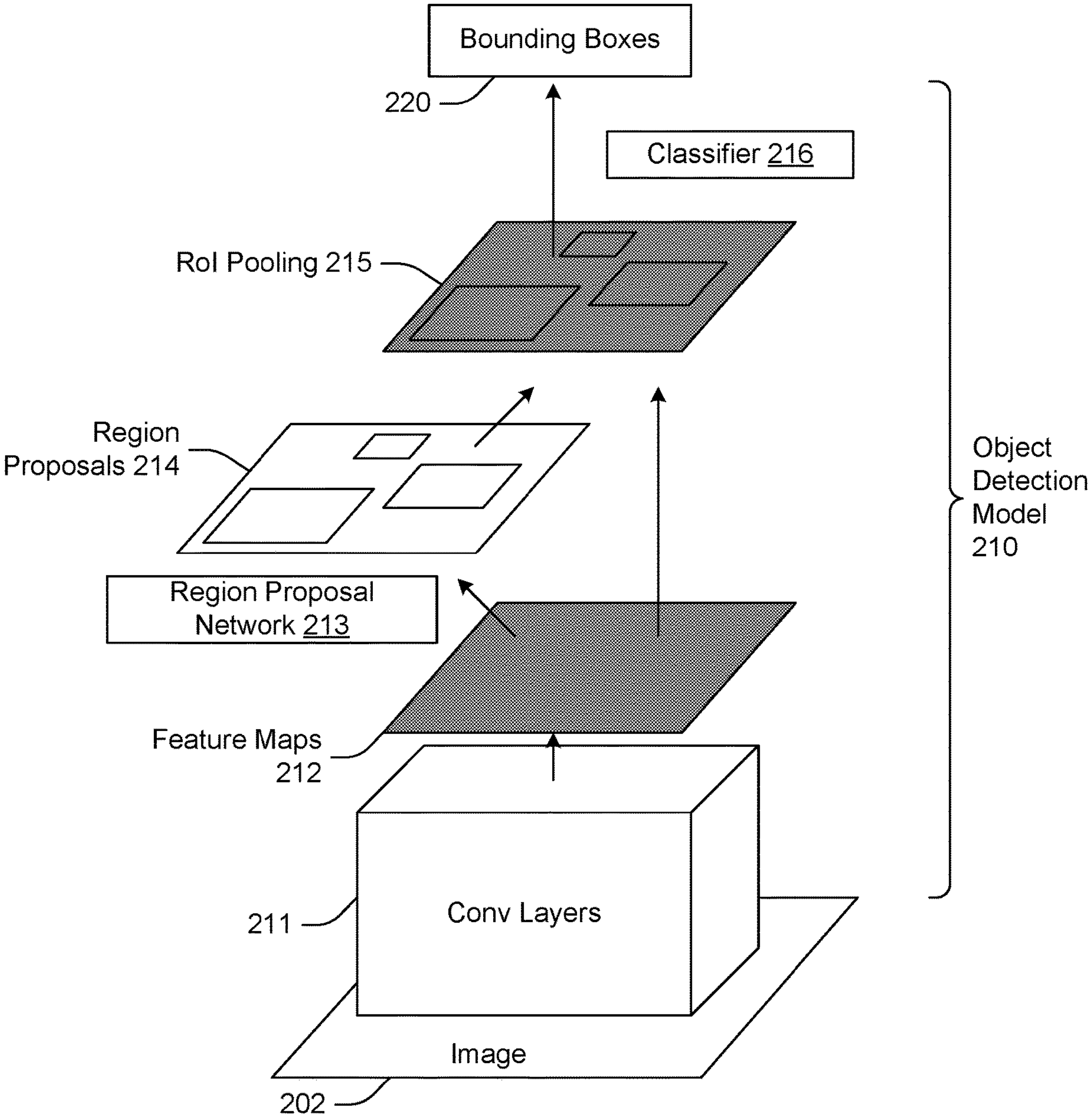
FIG. 2 illustrates an example machine learning model that can be employed for object detection in images, consistent with some implementations of the present concepts.

FIG. 2 shows an example of an image 202 being processed using an object detection model 210 to output bounding boxes 220 around detected objects. For instance, the object detection model can be a Faster R-CNN model (Ren, et al., "*Faster R-CNN: Towards Real—Time Object Detection with Region Proposal Networks*," Advances in Neural Information Processing Systems, 2015, 28). The image is processed using convolutional layers 211 to derive feature maps 212. The feature maps are processed using a region proposal network 213 to generate region proposals 214. Features for each region proposal are processed using region-of-interest ("RoI") pooling 215. A classifier 216 processes the features using two fully-connected layers that return an objectness score and a bounding box for each region proposal. The objectness score is used to determine if a given bounding box includes an object or is classified as background. The detected bounding boxes 220 can be output for each object detected in the image 202.

Inside object detection model 210, the feature maps 212 output by the last of the convolutional layers 211 is processed using a sliding window (e.g., a rectangle). One or more region proposals are generated for each rectangle. The region proposals can be parameterized according to "anchors," which are reference boxes centered at the sliding window, with different scales and aspect ratios. During training, objectness scores are calculated based on an Intersection-Over-Union value that corresponds to the area of intersection between each anchor and a corresponding ground truth box (e.g., provided by a human). For instance, in some cases, any anchor with an Intersection-Over-Union value exceeding 0.7 is characterized with a positive objectness value, and negative objectiveness scores for Intersection-Over-Union values below 0.3.

Note that the region proposal network 213 and the classifier 216 can share convolutional layers 211, and thus the region proposal network and classifier can be trained together. One training approach involves alternating training where the region proposal network is trained first, and then those proposals are used to train the classifier. For tuning on new datasets, the convolutional layers can remain fixed while the classifier is tuned on the new dataset. In some implementations, the convolutional layers can be initialized by pretraining for image classification on a dataset such as ImageNet. Then, the model can be tuned using an object detection dataset such as PASCAL VOC.

Overall Workflow

Figure 3:
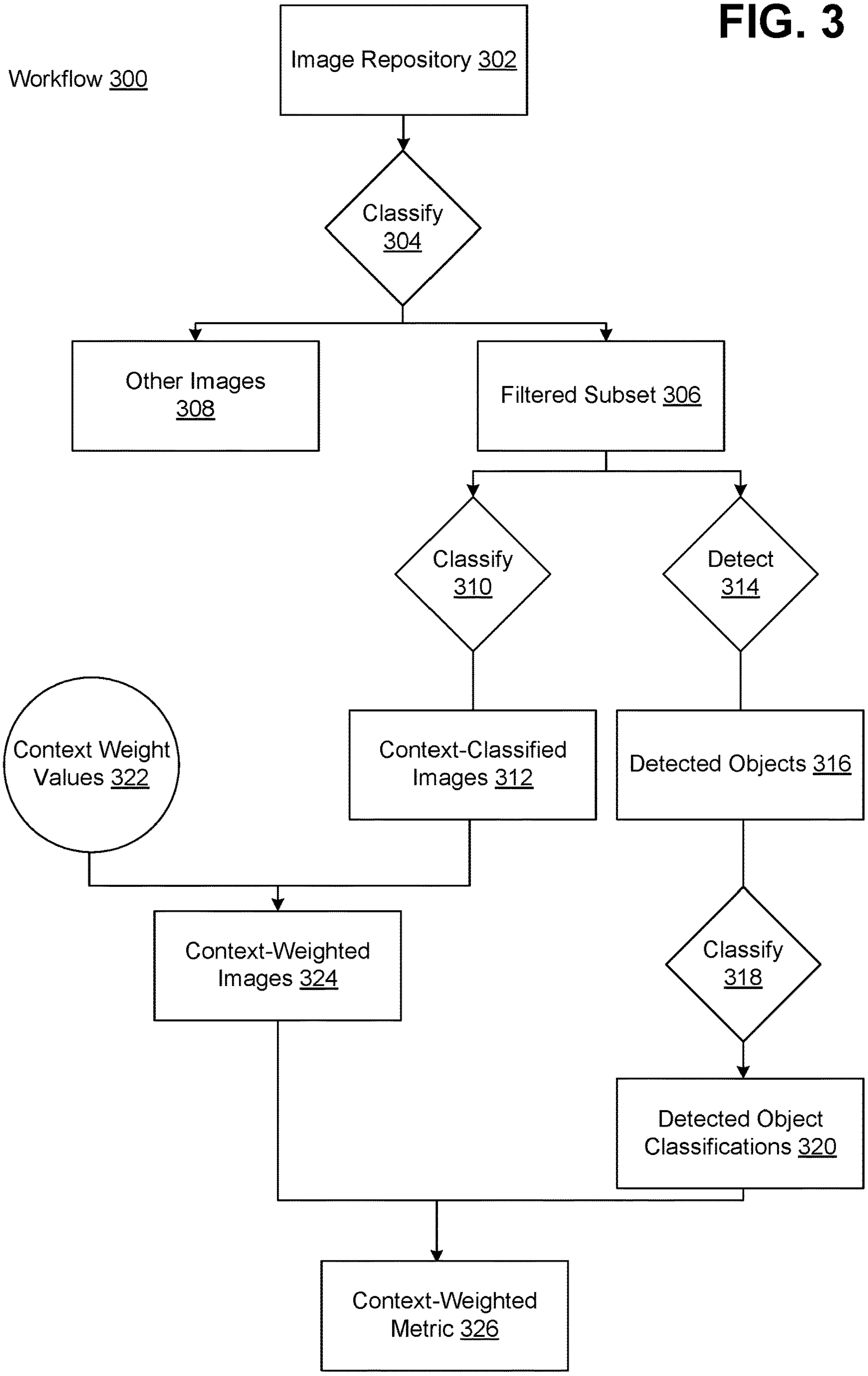
FIG. 3 illustrates an overall workflow that can be employed for context-based evaluation of images, consistent with some implementations of the present concepts.
Figure 4:
FIG. 4 illustrates an example of an image repository, consistent with some implementations of the present concepts.

FIG. 3 illustrates a workflow 300 for determining context-weighted metrics from an image repository 302. FIG. 4 shows image repository 302 in more detail, with images 401 through 412. The following discussion will walk through workflow 300 with respect to the 12 images shown in FIG. 4.

For the following discussion, assume that a user is interested in the relative significance of briefcases relative to other types of hand-carriable accessories (purses, handbags, etc.) in the image repository 302. The user does not care about other types of accessories that are not typically carried by hand, e.g., backpacks, fanny packs, etc. For the following discussion, the term "designated object subclassification" refers to briefcases. The term "designated object classification" refers to any hand-carriable accessory, including the briefcase subclassification and a handbag subclassification. Note that the hand-carriable accessory object classification can be considered part of a broader object classification that includes other carriable accessories such as backpacks or fanny packs that are not generally carried by hand. However, for the following examples, the user is not concerned with the significance of briefcase relative to non-hand carriable accessories, only relative to other hand-carriable accessories.

Figure 5:
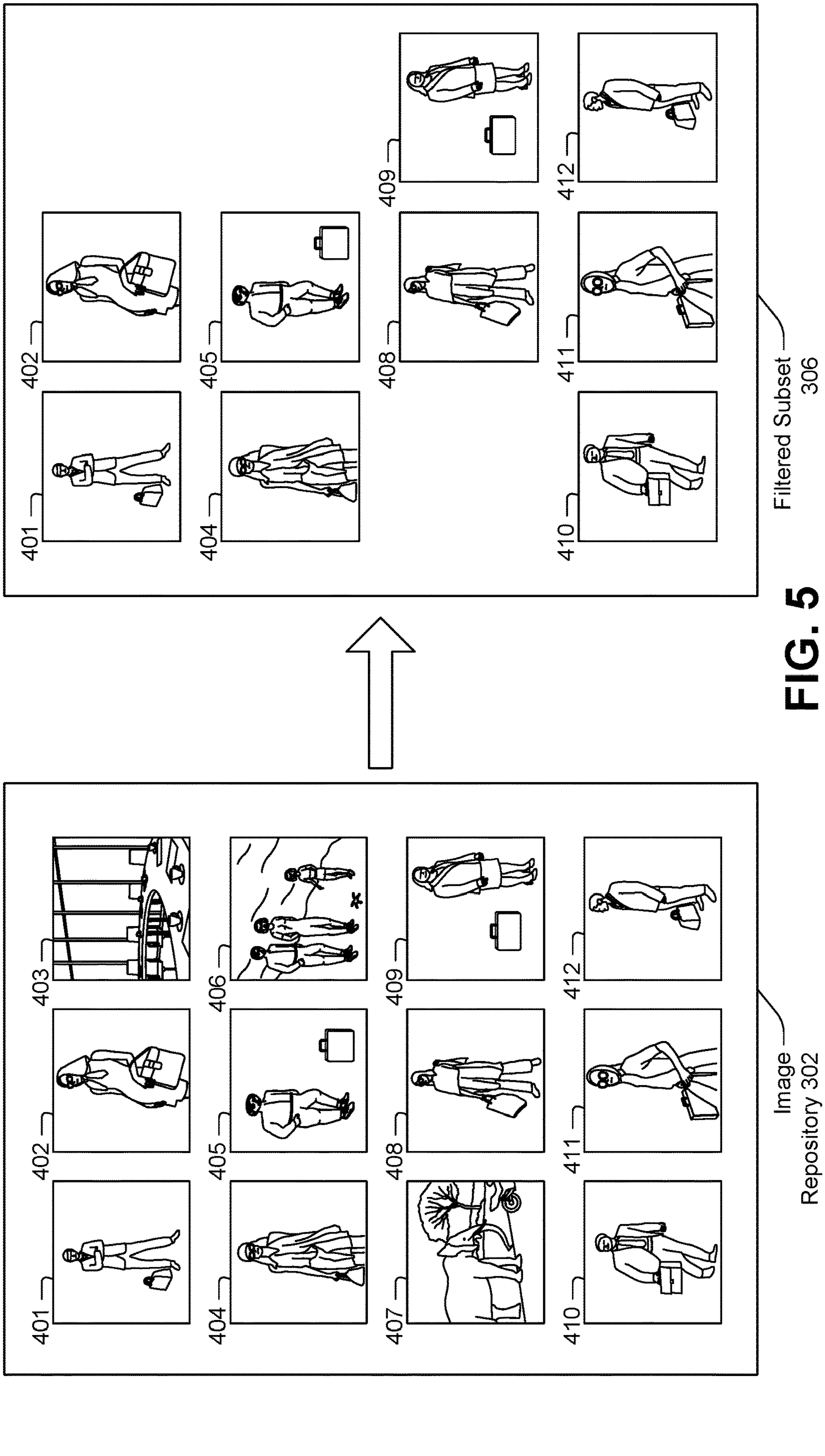
FIG. 5 illustrates an example of filtering an image repository, consistent with some implementations of the present concepts.

Workflow 300 can begin with a first classification operation 304 that involves determining whether each image in the image repository meets one or more filtering criteria. For instance, the filtering criteria relates to any type of carriable accessory for holding personal items that can be, e.g., a backpack, briefcase, handbag, fanny pack, etc. Any image that includes such an accessory can be included in a filtered subset 306, and other images 308 can be removed. FIG. 5 shows filtered subset 306 in more detail, with images 403, 406, and 407 having been removed because these images do not include carriable accessories of any kind.

Figure 6:
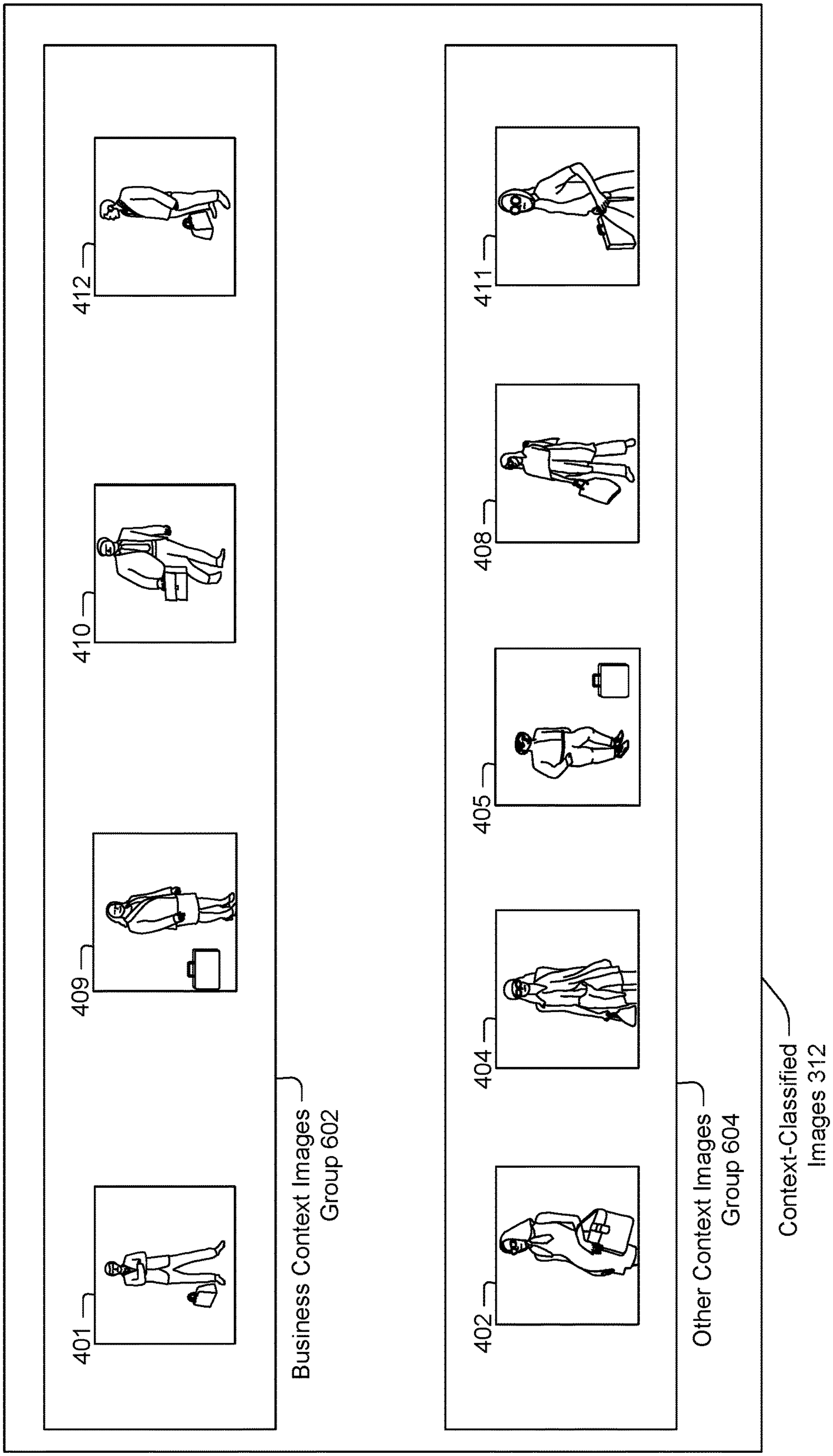
FIG. 6 illustrates an example of classifying contexts in images that have been filtered from a repository, consistent with some implementations of the present concepts.

A second classification operation 310 can be performed on the images of the filtered subset 306 to determine the context in which the objects of the designated object classification are presented, resulting in context-classified images 312. Each image can be classified as conveying a business context or other contexts (e.g., casual, fashion, etc.). As shown in FIG. 6, this results in business context images group 602 as well as other context images group 604. In this case, the clothing depicted in the images can convey the context. However, in other cases, the context can be conveyed in other ways, e.g., computers or office equipment for a business context, a runway or clothing store for a fashion context, etc.

Figure 7:
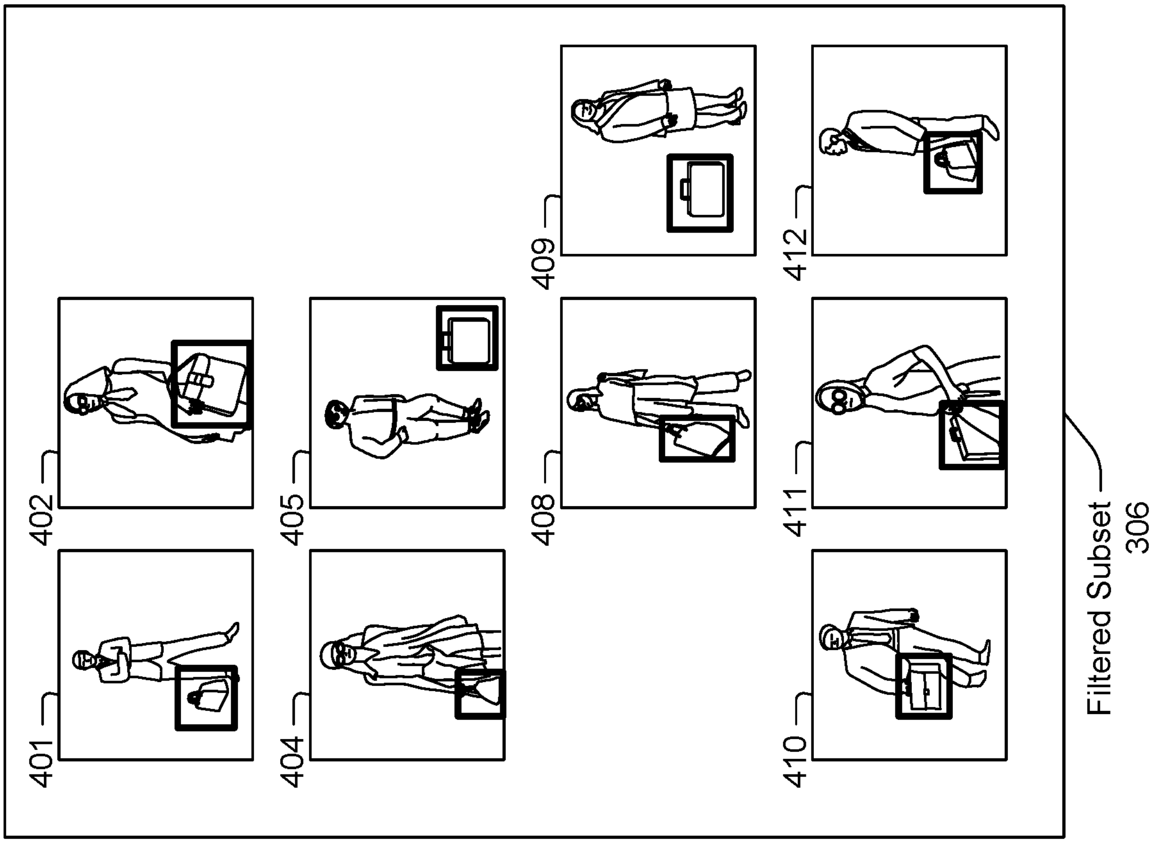
FIG. 7 illustrates an example of detecting objects in images that have been filtered from a repository, consistent with some implementations of the present concepts.

A detect operation 314 can be performed on the images of the filtered subset 306 to determine bounding boxes around each of the objects of the designated object classification, e.g., hand-carried accessories. The detected objects can be located using bounding boxes, as shown in FIG. 7. Although not shown in FIG. 7, note that the detect operation would not detect a backpack or fanny pack in the filtered subset of images, as these are not objects from the designated object classification of hand-carriable accessories.

Figure 8A:
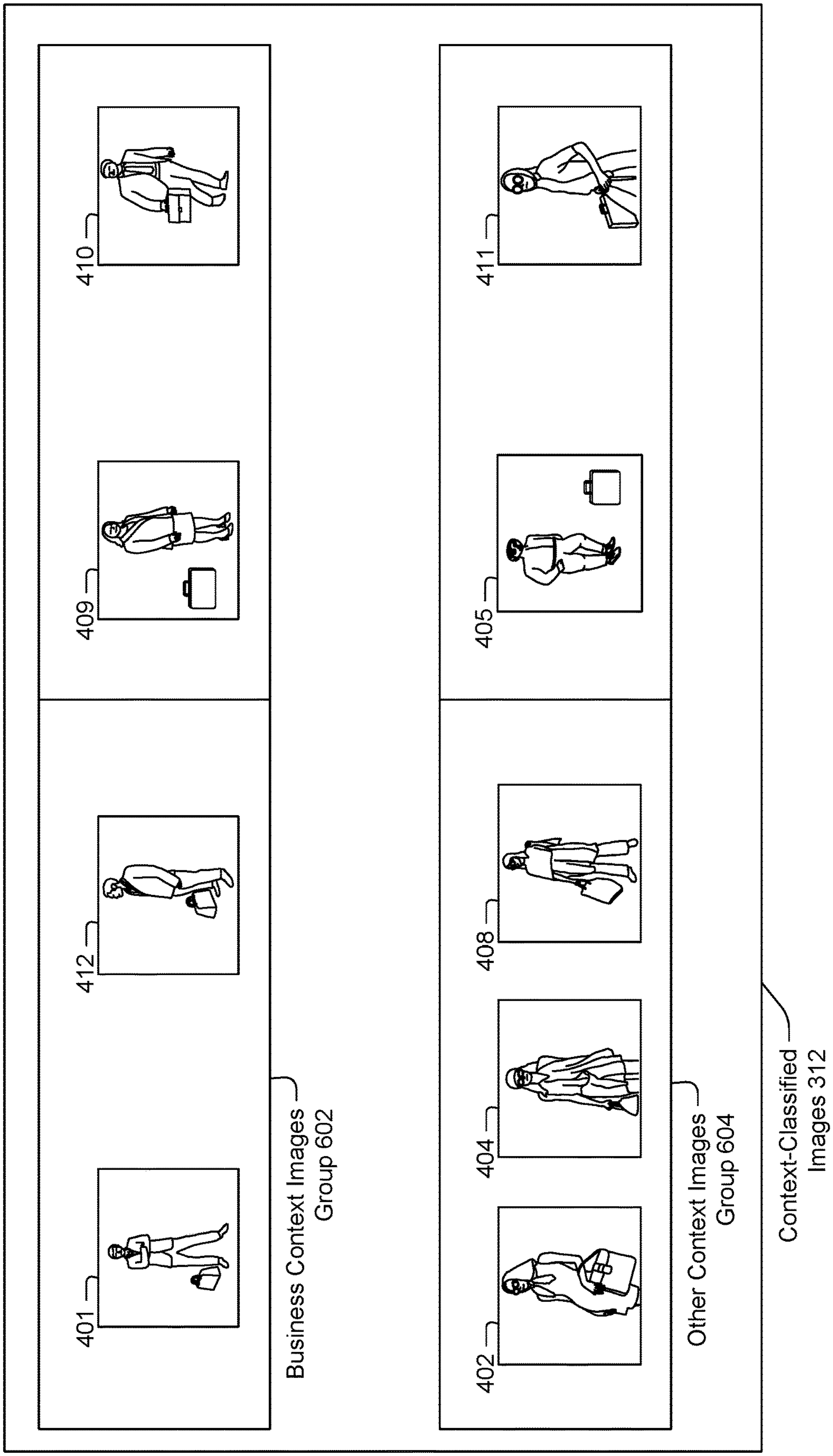
FIGS. 8A, 8B, and 8C illustrate examples of classifying objects in images that have been filtered from a repository, consistent with some implementations of the present concepts.

A third classification operation 318 can be performed on the detected objects to determine subclassifications for each of the detected objects. As noted, the subclassifications can include briefcases and other types of hand-carriable accessories. FIG. 8A shows the context-classified images 312 sorted according to the subclassifications of the objects shown therein. Images with briefcases are shown on the right side of the figure while images with other types of hand-carriable accessories are shown on the left side of the figure.

Context weight values 322 can be received for the different contexts recognized by the second classification operation 310. For instance, a weight of 0.7 could be assigned to the business context and a weight of 0.3 could be assigned to any other context. Then, each image can be assigned a corresponding weight based on its respective context, resulting in context-weighted images 324. Referring back to FIG. 8A, each of the images in business context images group 602 receives a weight of 0.7, and each of the images in the other context images group 604 receives a weight of 0.3.

Next, a context-weighted metric 326 can be computed for a designated object subclassification of interest as follows:

$$\sum_i W_i \frac{\text{Number of objects of designated subclassification in } i}{\text{total number of detected objects of designated classification in } i}$$

where i refers to an image in the repository and $w_i$ refers to context weight for the context represented in i. As shown above, the context-weighted metric can involve a summation over each image in the filtered subset. The summation can be performed over a weighted quotient. The weighted quotient can be obtained using a context-specific weight for each context represented in each image having a detected object. The context-specific weight can be applied in a multiplying operation on a quotient obtained by dividing the number of objects in a given image into a designated object subclassification over the total number of detected objects in the image.

Consider how the context-weighted metric can be calculated with respect to the images shown in FIG. 8A. Images 409 and 410 show briefcases in a business context and each have a context weight of 0.7 (1.4 total), and images 405 and 411 show briefcases in other contexts with a weight of 0.3 (0.6 total). Thus, the context-weighted metric for briefcases in this example is 2.0.

Figure 8B:
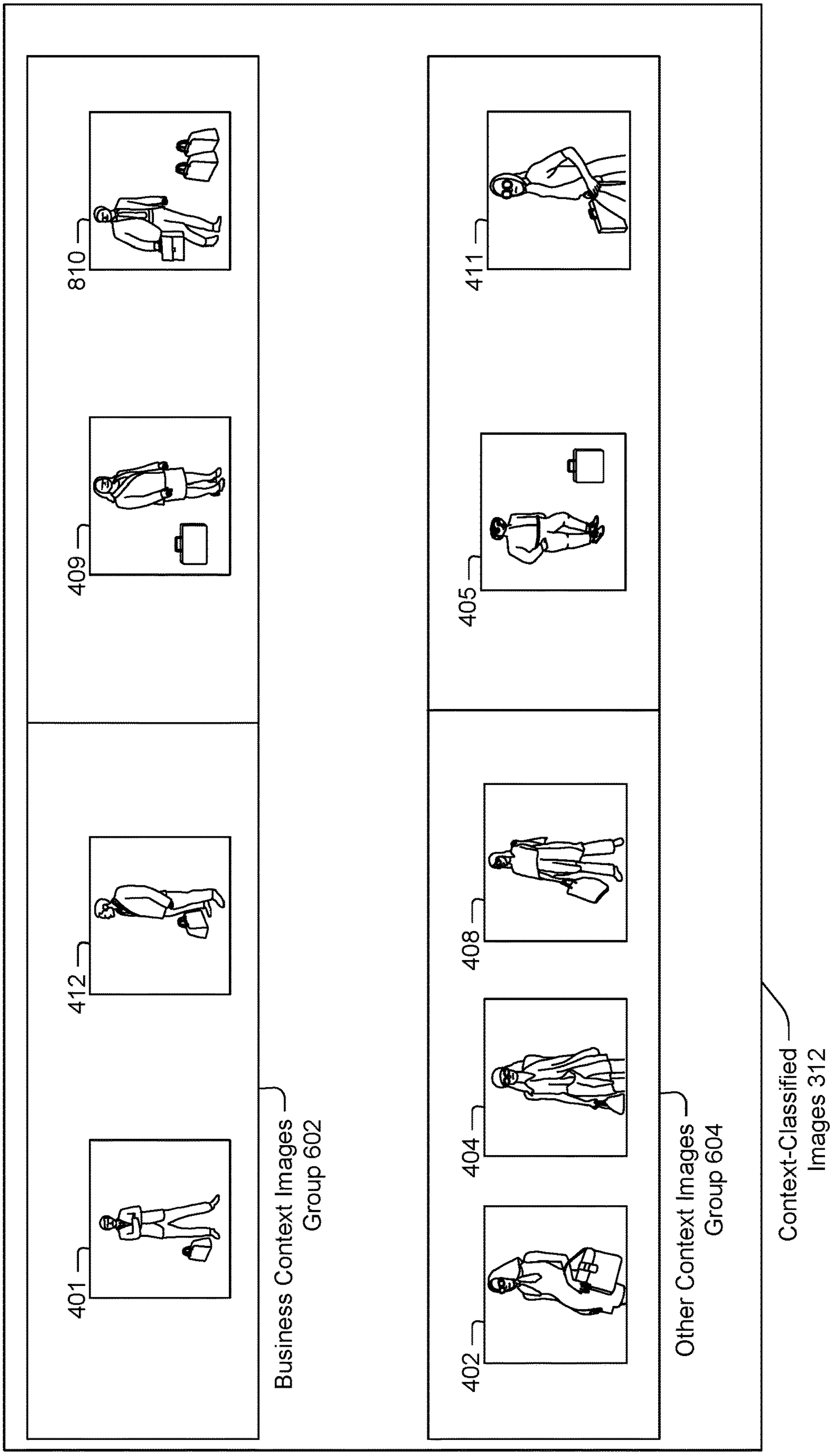

To illustrate how the presence of multiple objects being detected in a given image can influence the context-weighted metric, consider FIG. 8B. Here, image 410 from FIG. 8A has been replaced with image 810. Image 810 is otherwise identical to image 410 but includes two handbags in addition to the briefcase. Now, the denominator for image 810 is 3 instead of 1 as was the case for image 410. Thus, the contribution of image 810 for the overall metric is (⅓)*0.7, or 0.23 instead of 0.7 as for image 410. The overall context-weighted metric for the repository as whole is reduced from 2.0 to 1.53.

Figure 8C:
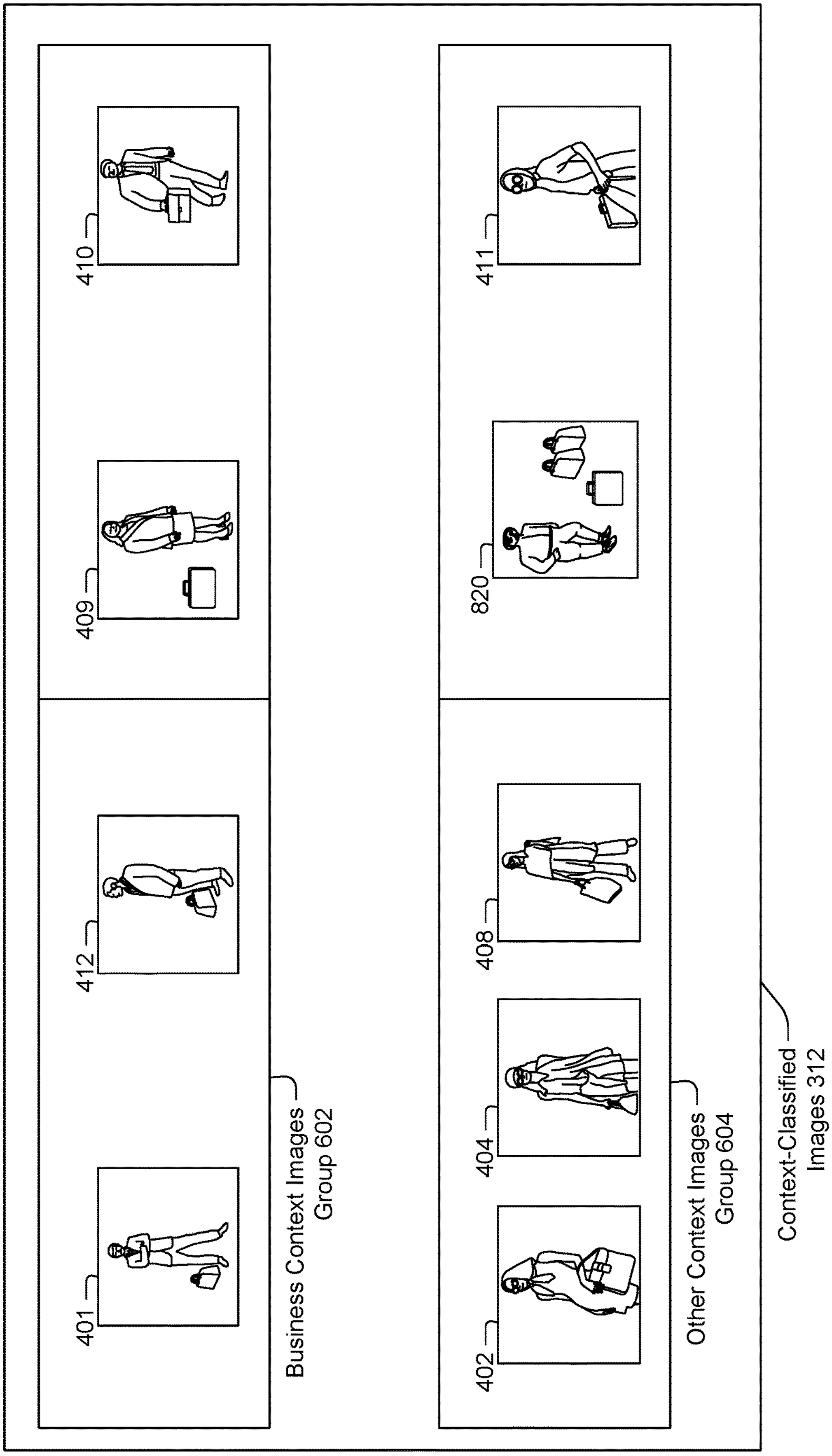

To illustrate how the presence of other objects in a given image can change the value of the context-weighted metric depending on the context, consider FIG. 8C. Here, image 405 from FIG. 8A has been replaced with image 820. Image 820 is otherwise identical to image 405, but includes two handbags in addition to the briefcase. Now, the denominator for image 820 is 3 instead of 1 for image 410. Thus, the contribution of image 820 for the overall metric is (⅓)*0.3, or 0.1 instead of 0.3 as for image 405. The overall context-weighted metric for the repository as whole is reduced from 2.0 to 1.8.

Referring back to FIGS. 8B and 8C, note how adding hand-carried accessories other than briefcases reduced the overall metric in both case relative to FIG. 8A. This is true for several reasons. First, the relative representation of briefcases in the image repository decreases, e.g., briefcases make up a lower total percentage of the hand-carried accessories in the image repository. Further, the addition of additional hand-carried accessories in a given context has the effect of diluting the representation of briefcases in that context.

Further, the overall effect of adding additional hand-carried accessories to images in the business context, as in FIG. 8B, is greater than the effect of adding hand-carried accessories in the other context, as in FIG. 8C. Recall that that the context weight values prioritize the salience of briefcases in the business context more heavily than in other contexts. Thus, diluting the relative number of briefcases in the business context has a greater influence on the overall metric than diluting the relative number of briefcases in the other context. The extent to which context influences the value of the resulting metric can be adjusted by varying the weighting scheme for the different contexts.

Example System

The present implementations can be performed in various scenarios on various devices. FIG. 9 shows an example system 900 in which the present implementations can be employed, as discussed more below.

As shown in FIG. 9, system 900 includes a client device 910, a server 920, a server 930, and a server 940, connected by one or more network(s) 950. Note that the client device can be embodied as a mobile device such as a smart phone or tablet, as well as a stationary device such as a desktop, server device, etc. Likewise, the servers can be implemented using various types of computing devices. In some cases, any of the devices shown in FIG. 9, but particularly the servers, can be implemented in data centers, server farms, etc.

Certain components of the devices shown in FIG. 9 may be referred to herein by parenthetical reference numbers. For the purposes of the following description, the parenthetical (1) indicates an occurrence of a given component on client device 910, (2) indicates an occurrence of a given component on server 920, (3) indicates an occurrence on server 930, and (4) indicates an occurrence on server 940. Unless identifying a specific instance of a given component, this document will refer generally to the components without the parenthetical.

Generally, the devices 910, 920, 930, and/or 940 may have respective processing resources 901 and storage resources 902, which are discussed in more detail below. The devices may also have various modules that function using the processing and storage resources to perform the techniques discussed herein. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Client device 910 can include a local image repository 911 and a local application 912. Server 920 can include a remote image repository 921 and a remote application 922. Generally speaking, the respective local and remote applications can provide functionality that facilitates managing either repository. For instance, the local and/or remote applications can allow users to add images to a given repository, delete images from a repository, caption or edit the images in the repository, browse the images in the repository, and/or query the repository to retrieve images matching one or more search terms.

Server 930 can include a model pretraining module 931 that can pretrain one or more image processing models (e.g., computer vision models). For instance, the model pretraining module can pretrain object classification and/or detection models and distribute the pretrained models to server 940.

Server 940 can include a tuning module 941. The tuning module can tune the pretrained models to provide one or more classification models 942 and one or more detection models 943. The classification and/or detection model(s) can be employed by metric determination module 944 to determine context-weighted metrics as described elsewhere herein, e.g., by performing workflow 300 shown in FIG. 3.

The local application 912 on client device 910 and/or the remote application 922 on server 920 can receive the context-weighted metrics from server 940. Then, the local and/or remote application can perform operations based on the context-weighted metrics. For instance, if a user enters a search query relating to a particular context, the local and/or remote application can rank the images based at least on a context-weighted metric for that context.

Example Method

Figure 10:
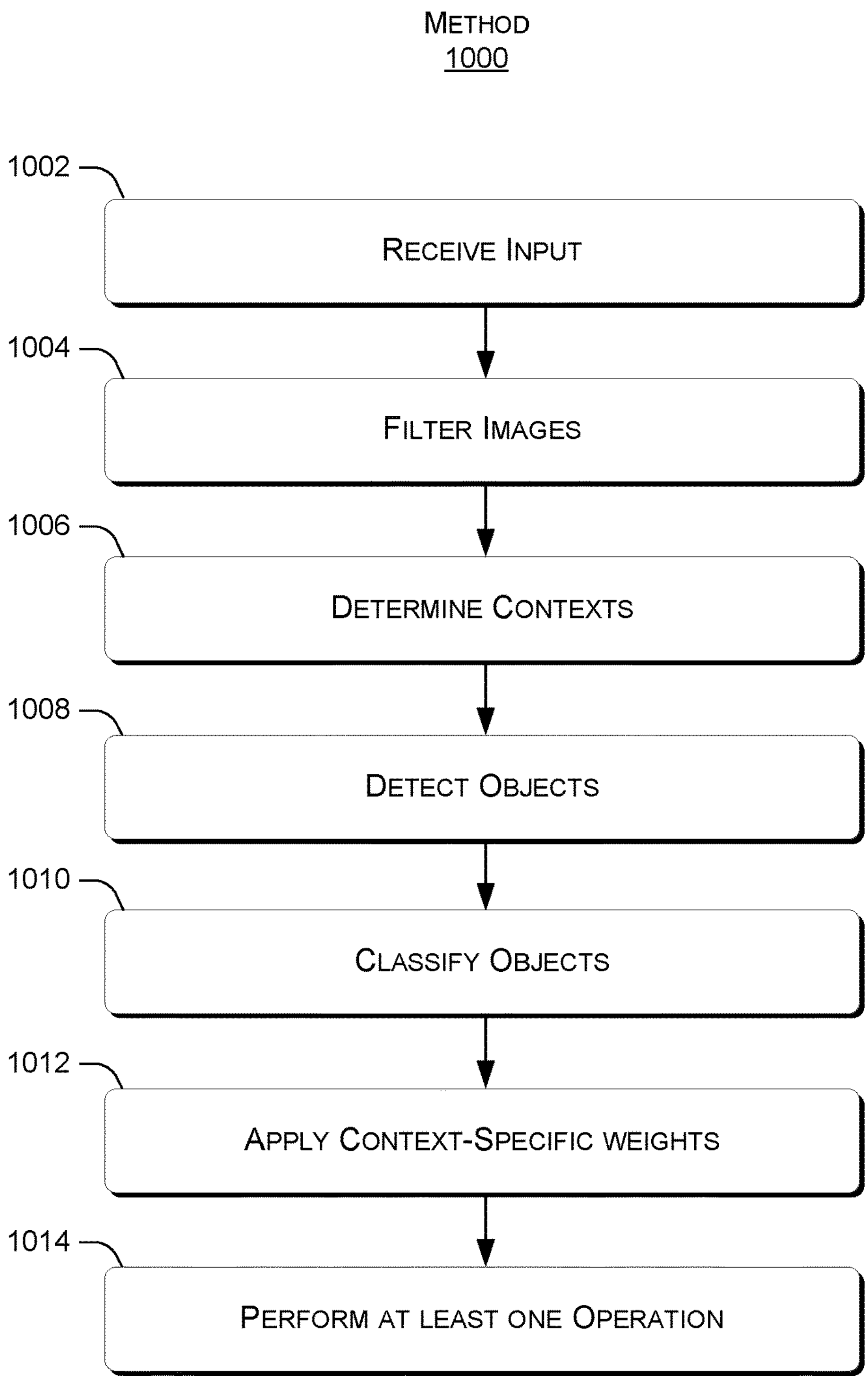
FIG. 10 illustrates an example method or technique, consistent with some implementations of the disclosed techniques.

FIG. 10 illustrates an example method 1000, consistent with some implementations of the present concepts. Method 1000 can be implemented on many different types of devices, e.g., by one or more cloud servers, by a client device such as a laptop, tablet, or smartphone, or by combinations of one or more servers, client devices, etc.

Method 1000 begins at block 1002, where input is received identifying a designated object subclassification. For instance, the designated object subclassification (e.g., briefcases) can be part of a designated object classification (e.g., hand-carriable accessories) having multiple object subclassifications including the designated object subclassification and one or more other object subclassifications (e.g., handbags).

Method 1000 continues at block 1004, where an image repository can be filtered to obtain a filtered subset of images. For instance, the image repository can be located on a user device, on a cloud server, etc. In some cases, the image repository can be a personal image repository, e.g., on a user's mobile device having a camera that captures the images. In other cases, the image repository can be associated with a social media account of a user. In still further cases, the image repository can be associated with a search engine, e.g., users of the search engine may be able to search the repository by submitting queries to the search engine. The filtering can be based on one or more filtering criteria relating to the designated object classification, as described more below.

Method 1000 continues at block 1006, where different contexts are determined for the images in the filtered set of images. For instance, the contexts can relate to other objects present in the images, such as a first context for people in business attire and a second context for people in other types of attire (fashion, casual, etc.). As another example, the contexts can relate to the environment in which the objects are presented, e.g., drinks presented in fancy restaurants as one context vs. drinks presented in fast food restaurants as another context, or drinks in an outdoors setting as one context vs. drinks presented in an indoor setting as another context.

Method 1000 continues at block 1008, where objects of the designated object classification are detected in the filtered set of images. For instance, objects of the designated object classification can be located in the images from the filtered subset. The locations can be designated with boundaries, e.g., bounding boxes. If the user is interested in hand-carriable accessories, the bounding boxes can be placed around any hand-carriable accessory (e.g., briefcases, purses, handbags) but not around other types of accessories (e.g., backpacks, fanny packs, etc.). If the user is interested in soft drinks, then bounding boxes can be placed around soft drinks but not other types of drinks (e.g., juices, beers, wines, etc.).

Method 1000 continues at block 1010, where the detected objects are classified into object subclassifications. For instance, hand-carriable accessories can be classified into a briefcase subclassification and one or more other subclassifications, e.g., handbags, purses, etc. As another example, soft drinks can be classified by brand.

Method 1000 continues at block 1012, where different context-specific weights are applied to determine a context-weighted metric. For instance, if the designated object classification is hand-carriable accessories, then different weights can be provided for a designated object subclassification of interest (e.g., briefcases) vs. other object subclassifications (e.g., purses, handbags). If the designated object classification is soft drinks, then different weights can be provided for a designated object subclassification of interest (e.g., Brand A cola) vs. another object subclassification.

Method 1000 continues at block 1014, where at least one operation is performed based on the context-weighted metric. For instance, in some cases, images can be ranked according to the context weighted metric. If a user queries for hand-carried accessories in a business context, then images with briefcases might be ranked higher than images with purses or handbags. If a user queries for soft drinks in a classy restaurant setting, then images with Brand B ginger ale might be ranked higher than images with Brand A cola, assuming the context-weighted metric for classy restaurants is higher for Brand B ginger ale.

In some cases, some or all of method 1000 is performed by a server. In other cases, some or all of method 1000 is performed on another device, e.g., a client device.

Additional Implementations

The description above introduced some examples to convey certain concepts relating to context-based evaluation of objects. However, many other implementations are contemplated. As but one example, refer back to FIG. 1, which illustrates a ResNet image classification model. In some implementations, a ResNet or other image classification model can be already pretrained on images having objects from the designated object classifications and/or designated subclassifications of interest. In this case, the pretrained image classification model can be employed directly as described above. Likewise, refer back to FIG. 2, which illustrates a Faster R-CNN model which can be pretrained to detect various object classifications. Likewise, if the detection model has been pretrained to detect the objects of interest, then the pretrained detection model can be employed as described above without further tuning.

However, consider a scenario where the pretrained image classification model and/or detection model has not been pretrained on objects from the designated classifications or subclassifications of interest. As noted previously, a pretrained model can be tuned using relatively few training examples compared to the number of training examples involved to complete pretraining. For instance, consider the carriable accessory examples introduced above. A pretrained model could be tuned to provide three individual models for use in workflow 300, with different tuned models being employed at first classification operation 304, second classification operation 310, and third classification operation 318.

Since the first classification operation 304 is performed for the purposes of a high-level initial filtering, a pretrained model can be tuned using a very inclusive approach. For instance, consider the hand-carriable accessory examples set forth above. Some implementations can tune a pretrained image classification model to identify a broader object classification than hand-carriable accessories, e.g., any carriable accessory including those not typically carried by hand. In this case, the filtering criteria includes any image that includes objects that are frequently carried by humans, such as backpacks, wallets, purses, laptop bags, fanny packs, etc. Other implementations can employ a heuristic approach by identifying other object or context classifications that tend to co-occur with carriable accessories, e.g., users in contexts of airports and schools may tend to have carriable accessories of some sort whereas users at home tend to not have carriable accessories nearby. Such a model can be employed in workflow with a permissive threshold to allow a large number of images to pass through the filtering.

Next, the pretrained image classification model can be tuned to obtain a second image classification model that can distinguish between business contexts and other contexts, e.g., casual, fashion, etc. In some cases, such a tuned model can be employed at second classification operation 310 to perform further filtering of an image repository. For instance, referring back to FIG. 6, if a user is only interested in business and fashion contexts but not casual contexts, then image 406 could be filtered out at this stage.

Next, the pretrained object detection model can be tuned to detect objects from the object classification of interest. For example, the pretrained object detection model could be tuned using images having bounding boxes around hand-carriable accessories, with negative examples including other types of accessories (e.g., backpacks or fanny packs) that are not typically hand-carried. Again, this can allow for further filtering, e.g., detect operation 314 can be used to filter out any images that passed through the first classification operation 304 but where the tuned detection model does not detect hand-carriable accessories.

Next, the pretrained image classification model can be tuned to obtain a third image classification model that can distinguish between subclassifications of interest. For example, a pretrained classification model can be tuned specifically on examples having pictures of briefcases and other hand-carriable accessories. Then, the tuned classification model can be employed for third classification operation 318, to classify the objects detected at detect operation 314.

In effect, the disclosed techniques can provide a cascaded filtering approach where the classification and/or detection operations can serve to not only extract information used for determining the context-weighted metric, but also to remove images from consideration by subsequent stages. This saves processing, storage, memory, and/or network resources that would otherwise be employed in the subsequent stages.

In addition, the tuning approaches described above also exhibit computational efficiency. Instead of training a single large, heavyweight model to classify and/or detect all types of carriable accessories and/or all contexts of interest, separate models can be tuned at varying levels of refinement. As a result, less training data is needed for the tuning of each individual model, and the individual models can be tuned using fewer tuning iterations.

Further, note that some implementations can employ a relatively light-weight model for initial filtering and then progressively more computationally-intense models for subsequent stages. For instance, a lightweight MobileNet model could be employed for first classification operation 304, with a permissive threshold to ensure that few or no images with objects of interest are filtered out. On the other hand, a more computationally demanding VGGNet or ResNet model could be tuned for the other classification operations 310 and/or 318.

As a still further note, in some cases natural language supervision can be employed to train and/or tune an image classification model. For instance, third classification operation 318 can be implemented using a tuned CLIP model that employs both an image encoder and a text encoder. By tuning the clip model to predict which images have captions using the word "briefcase" vs. other images having captions using words such as "purse" or "handbag," the model can learn embeddings representing these concepts. The learned embeddings can then be employed for inference when performing third classification operation 318.

In addition, note that the tuning examples for any of the classification or detection models described above can be obtained in different ways. In some cases, human users can manually label objects in images with object classification or subclassification labels. In other cases, generative image models such as Stable Diffusion or DALL-E can be instructed to generate numerous images with different objects in different contexts to use as synthetic training examples. For example, a prompt to a generative image model might request 100 images of briefcases in business and non-business contexts, 100 images of handbags in business and non-business contexts, and 100 images of backpacks in business and non-business contexts. All three sets of images could be used to tune a first object classification model for first classification operation 304, e.g., a model that can recognize any type of carriable accessory. Likewise, all three sets of images could be used to tune a second image classification model for second classification operation 310, which recognizes business vs. non-business contexts. The detection model employed for detect operation 314 (e.g., to detect hand-carriable accessories) could be trained using the images of briefcases and handbags with bounding boxes drawn around the accessories, potentially using the images of backpacks as negative training examples. A third classification model used for third classification operation 318 could be tuned using the images of briefcases and handbags as well. In each case, the prompt used to generate a given image can be employed as a label for the context, object classification, and/or object subclassification represented in that image.

Note also that images produced by a generative image model can be produced using different modes. In some cases, a generative image model could be prompted to generate new images from scratch, with the prompt specifying the type of object as well as the context. In other cases, a generative image model could be given an existing image, e.g., of a briefcase in a business context, and instructed to inpaint over the briefcase with a handbag. Thus, for example, an existing caption of the image could be employed as a context label, with the "handbag" prompt to the generative image model serving as the object classification label.

In addition, note that the example equation provided above is but one way to compute a context-weighted metric for a given type of object. In some instances, a context-weighed metric can be calculated using additional information. As one example, each detected object can be weighted for salience based on the number of pixels that the detected object occupies in a given image (e.g., the area of the bounding box). Thus, an instance of a briefcase prominently featured in the foreground could be given a higher weighting than an instance of a briefcase that is obscured in the background and barely visible. As another example, objects closer to the center of an image can be weighted relatively higher than objects near the edge of a given image.

In further implementations, sources of information outside of the image itself can be used to supplement the determination of the metric. For instance, consider a search engine. The number of impressions of a given image could be used to weight that image relative to other images. Thus, for instance, if users retrieve images of briefcase in a business context far more often than images of handbags in a business context, then the salience of briefcases in the business context is greater. This is true even if the actual number of images indexed by the search engine does not reflect this, e.g., the search engine might actually index more images of handbags in other contexts than briefcases in business contexts, but the search engine may actually be returning more search results with the briefcases in the business context. In a similar manner, user dwell time could be used to weight the metric, e.g., if users look at images with briefcases in business contexts longer than at images with handbags in business contexts, this also implies that briefcases are relatively more significant in business contexts.

As another point, note that the disclosed techniques can be extended beyond static images to encompass video and/or virtual or augmented reality scenarios. With respect to video, a single frame of a video can be treated as a static image and processed as described previously. In some cases, frames could be sampled from a video periodically (e.g., once per second), and then all the sampled frames of the video could be processed as described above to compute metrics from the video. A similar sampling approach could be employed for virtual and/or augmented reality scenarios.

Device Implementations

As noted above with respect to FIG. 9, system 900 includes several devices, including a client device 910, a server 920, a server 930, and a server 940. As also noted, not all device implementations can be illustrated, and other device implementations should be apparent to the skilled artisan from the description above and below.

The term “device”, “computer,” “computing device,” “client device,” and or “server device” as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on storage, such as storage/memory and or the datastore. The term “system” as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term “computer-readable media” can include signals. In contrast, the term “computer-readable storage media” excludes signals. Computer-readable storage media includes “computer-readable storage devices.” Examples of computer-readable storage devices include volatile storage media, such as RAM, and non-volatile storage media, such as hard drives, optical discs, and flash memory, among others.

In some cases, the devices are configured with a general-purpose hardware processor and storage resources. Processors and storage can be implemented as separate components or integrated together as in computational RAM. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term “processor,” “hardware processor” or “hardware processing unit” as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.), microphones, etc. Devices can also have various output mechanisms such as printers, monitors, speakers, etc.

Also note that the devices described herein can function in a stand-alone or cooperative manner to implement the described techniques. For example, the methods and functionality described herein can be performed on a single computing device and/or distributed across multiple computing devices that communicate over network(s) 950. Without limitation, network(s) 950 can include one or more local area networks (LANs), wide area networks (WANs), the Internet, and the like.

Additional Examples

Various examples are described above. Additional examples are described below. One example includes a computer-implemented method comprising receiving input identifying a designated object subclassification, the designated object subclassification being part of designated object classification having multiple object subclassifications including the designated object subclassification and one or more other object subclassifications, filtering images of an image repository to obtain a filtered subset of images that meet one or more filtering criteria relating to the designated object classification, determining different contexts represented in the filtered subset of images, wherein the different contexts are associated with different context-specific weights, detecting objects of the designated object classification in the filtered subset of images, classifying the detected objects into the multiple object subclassifications, the classified objects including particular objects classified into the designated object subclassification and one or more other objects classified into the one or more other object subclassifications, applying the different context-specific weights to occurrences of the particular objects that are classified into the designated object subclassification to determine a context-weighted metric, and performing at least one operation based at least on the context-weighted metric.

Another example can include any of the above and/or below examples where the filtering is performed using a first image classification model.

Another example can include any of the above and/or below examples where the one or more filtering criteria relate to other object classifications or context classifications that tend to co-occur with the designated object classification.

Another example can include any of the above and/or below examples where the one or more filtering criteria relate to a broader object classification that includes the designated object classification and one or more other object classifications.

Another example can include any of the above and/or below examples where the method further comprises determining the different contexts using a second image classification model.

Another example can include any of the above and/or below examples where the different contexts relate to environments represented in the filtered subset of images.

Another example can include any of the above and/or below examples where the different contexts relate to other object classifications of other objects represented in the filtered subset of images.

Another example can include any of the above and/or below examples where the method further comprises detecting the objects of the designated object classification using an object detection model, the object detection model determining boundaries of the objects.

Another example can include any of the above and/or below examples where the method further comprises classifying the detected objects into the multiple object subclassifications using a third image classification model.

Another example can include any of the above and/or below examples where the determining the context-weighted metric comprises for each respective image in the filtered subset having at least one detected object, dividing a number of occurrences of the particular objects in the respective image that are classified into the designated object subclassification by a total number of detected objects in the respective image.

Another example can include any of the above and/or below examples where the determining the context-weighted metric comprises obtaining weighted quotients by multiplying a quotient of the dividing by a corresponding context-specific weight for each respective context represented in each respective image.

Another example can include any of the above and/or below examples where the method further comprises performing a summation over the weighted quotients for each of the images in the filtered set of images.

Another example can include any of the above and/or below examples where the at least one operation comprises ranking individual images relative to a query based at least on the context-weighted metric and responding to the query based at least on the ranking.

Another example can include any of the above and/or below examples where the method further comprises receiving a pretrained image classification model and tuning the pretrained image classification model using training examples relating to the one or more filtering criteria to obtain the first image classification model.

Another example can include any of the above and/or below examples where the method further comprises receiving a pretrained image classification model and tuning the pretrained image classification model using training examples of the different contexts to obtain the second image classification model.

Another example can include any of the above and/or below examples where the method further comprises receiving a pretrained object detection model and tuning the pretrained object detection model using training examples having boundaries around objects of the designated object classification to obtain the object detection model.

Another example can include any of the above and/or below examples where the method further comprises receiving a pretrained image classification model and tuning the pretrained image classification model using training examples relating to the designated object subclassification and the one or more other object subclassifications to obtain the third image classification model.

Another example includes a system comprising a processor and a storage medium storing instructions which, when executed by the processor, cause the system to filter images of an image repository to obtain a filtered subset of images that meet one or more filtering criteria relating to a designated object classification that includes multiple object subclassifications including a designated object subclassification and one or more other object subclassifications, determine different contexts represented in the filtered subset of images, wherein the different contexts are associated with different context-specific weights, detect objects of the designated object classification in the filtered subset of images, classify the detected objects into the multiple object subclassifications, the classified objects including particular objects classified into the designated object subclassification and one or more other objects classified into the one or more other object subclassifications, apply the different context-specific weights to occurrences of the particular objects that are classified into the designated object subclassification to determine a context-weighted metric, and perform at least one operation based at least on the context-weighted metric.

Another example can include any of the above and/or below examples where the instructions, when executed by the processor, cause the system to perform further filtering of the image repository to remove other images that lack either a designated context or a detected object prior to classifying the detected objects.

Another example includes a computer-readable storage medium storing executable instructions which, when executed by a processor, cause the processor to perform acts comprising receiving input identifying a designated object subclassification, the designated object subclassification being part of designated object classification having multiple object subclassifications including the designated object subclassification and one or more other object subclassifications, filtering images of an image repository to obtain a filtered subset of images that meet one or more filtering criteria relating to the designated object classification, determining different contexts represented in the filtered subset of images, wherein the different contexts are associated with different context-specific weights, detecting objects of the designated object classification in the filtered subset of images, classifying the detected objects into the multiple object subclassifications, the classified objects including particular objects classified into the designated object subclassification and one or more other objects classified into the one or more other object subclassifications, applying the different context-specific weights to occurrences of the particular objects that are classified into the designated object subclassification to determine a context-weighted metric, and performing at least one operation based at least on the context-weighted metric.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A computer-implemented method comprising:

receiving input identifying a designated object subclassification, the designated object subclassification being part of a designated object classification having multiple object subclassifications including the designated object subclassification and one or more other object subclassifications;

filtering images of an image repository to obtain a filtered subset of images that meet one or more filtering criteria relating to the designated object classification;

determining different contexts represented in the filtered subset of images, wherein the different contexts are associated with different context-specific weights;

detecting objects of the designated object classification in the filtered subset of images;

classifying the detected objects into the multiple object subclassifications, the classified objects including particular objects classified into the designated object subclassification and one or more other objects classified into the one or more other object subclassifications;

applying the different context-specific weights to occurrences of the particular objects that are classified into the designated object subclassification to determine a context-weighted metric; and performing at least one operation based at least on the context-weighted metric.

2. The computer-implemented method of claim 1, wherein the filtering is performed using a first image classification model.

3. The computer-implemented method of claim 2, wherein the one or more filtering criteria relate to a frequency with which other object classifications or context classifications co-occur with the designated object classification.

4. The computer-implemented method of claim 2, wherein the one or more filtering criteria relate to a broader object classification that includes the designated object classification and one or more other object classifications.

5. The computer-implemented method of claim 2, further comprising:

determining the different contexts using a second image classification model.

6. The computer-implemented method of claim 5, wherein the different contexts relate to environments represented in the filtered subset of images.

7. The computer-implemented method of claim 5, wherein the different contexts relate to other object classifications of other objects represented in the filtered subset of images.

8. The computer-implemented method of claim 5, further comprising:

detecting the objects of the designated object classification using an object detection model, the object detection model determining boundaries of the objects.

9. The computer-implemented method of claim 8, further comprising:

classifying the detected objects into the multiple object subclassifications using a third image classification model.

10. The computer-implemented method of claim 9, wherein the determining the context-weighted metric comprises:

for each respective image in the filtered subset having at least one detected object, dividing a number of occurrences of the particular objects in the respective image that are classified into the designated object subclassification by a total number of detected objects in the respective image.

11. The computer-implemented method of claim 10, wherein the determining the context-weighted metric comprises:

obtaining weighted quotients by multiplying a quotient of the dividing by a corresponding context-specific weight for each respective context represented in each respective image.

12. The computer-implemented method of claim 11, further comprising:

performing a summation over the weighted quotients for each of the images in the filtered subset of images.

13. The computer-implemented method of claim 9, wherein the at least one operation comprises:

ranking individual images relative to a query based at least on the context-weighted metric; and responding to the query based at least on the ranking.

14. The computer-implemented method of claim 9, further comprising:

receiving a pretrained image classification model; and tuning the pretrained image classification model using training examples relating to the one or more filtering criteria to obtain the first image classification model.

15. The computer-implemented method of claim 9, further comprising:

receiving a pretrained image classification model; and tuning the pretrained image classification model using training examples of the different contexts to obtain the second image classification model.

16. The computer-implemented method of claim 9, further comprising:

receiving a pretrained object detection model; and tuning the pretrained object detection model using training examples having boundaries around objects of the designated object classification to obtain the object detection model.

17. The computer-implemented method of claim 9, further comprising:

receiving a pretrained image classification model; and tuning the pretrained image classification model using training examples relating to the designated object subclassification and the one or more other object subclassifications to obtain the third image classification model.

18. A system comprising:

a processor; and a storage medium storing instructions which, when executed by the processor, cause the system to:

filter images of an image repository to obtain a filtered subset of images that meet one or more filtering criteria relating to a designated object classification that includes multiple object subclassifications including a designated object subclassification and one or more other object subclassifications;

determine different contexts represented in the filtered subset of images, wherein the different contexts are associated with different context-specific weights;

detect objects of the designated object classification in the filtered subset of images;

classify the detected objects into the multiple object subclassifications, the classified objects including particular objects classified into the designated object subclassification and one or more other objects classified into the one or more other object subclassifications;

apply the different context-specific weights to occurrences of the particular objects that are classified into the designated object subclassification to determine a context-weighted metric; and perform at least one operation based at least on the context-weighted metric.

19. The system of claim 18, wherein the instructions, when executed by the processor, cause the system to:

perform further filtering of the image repository to remove other images that lack either a designated context or a detected object prior to classifying the detected objects.

20. A computer-readable storage medium storing executable instructions which, when executed by a processor, cause the processor to perform acts comprising:

receiving input identifying a designated object subclassification, the designated object subclassification being part of a designated object classification having multiple object subclassifications including the designated object subclassification and one or more other object subclassifications;

filtering images of an image repository to obtain a filtered subset of images that meet one or more filtering criteria relating to the designated object classification;

determining different contexts represented in the filtered subset of images, wherein the different contexts are associated with different context-specific weights;

detecting objects of the designated object classification in the filtered subset of images;

classifying the detected objects into the multiple object subclassifications, the classified objects including particular objects classified into the designated object subclassification and one or more other objects classified into the one or more other object subclassifications;

applying the different context-specific weights to occurrences of the particular objects that are classified into the designated object subclassification to determine a context-weighted metric; and performing at least one operation based at least on the context-weighted metric.

* * * * *